US010338089B2

(12) United States Patent
Chakravarty et al.

(10) Patent No.: US 10,338,089 B2
(45) Date of Patent: Jul. 2, 2019

(54) SYSTEM AND METHOD FOR DETERMINING SPEED OF A VEHICLE BASED ON GPS SPEED (71) Applicant: Tata Consultancy Services Limited, Mumbai, Maharashtra (IN)

(72) Inventors: Tapas Chakravarty, Kolkata (IN); Arijit Chowdhury, Kolkata (IN); Balamuralidhar Purushothaman, Bangalore (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 474 days.

(21) Appl. No.: 14/751,749

(22) Filed: Jun. 26, 2015

(65) Prior Publication Data
US 2016/0011228 A1 Jan. 14, 2016

(30) Foreign Application Priority Data

Jul. 9, 2014 (IN) .......................... 2240/MUM/2014

(51) Int. Cl.
G01P 3/42 (2006.01)
G01S 19/13 (2010.01)
(Continued)

(52) U.S. Cl.
CPC ................ G01P 3/42 (2013.01); G01P 21/00 (2013.01); G01S 19/13 (2013.01); G01S 19/40 (2013.01); G01S 19/52 (2013.01)

(58) Field of Classification Search
CPC .............................................. G01P 3/00–3/806
See application file for complete search history.

(56) References Cited

U.S. PATENT DOCUMENTS 5,416,712 A 5/1995 Geier et al.
2015/0360794 A1* 12/2015 Certain ..................... G01P 5/26
701/7

FOREIGN PATENT DOCUMENTS

CN 102944886 A 2/2013
CN 102980589 A 3/2013

OTHER PUBLICATIONS

Tom J. Chalko, "High accuracy speed measurement using GPS (Global Positioning System)" Senior Scientist, Scientific Engineering Research P/L, Mt. Best, Vic 3960, Australia, 2007, 9 pages.
(Continued)

Primary Examiner — Gene N Auduong
(74) Attorney, Agent, or Firm — HM Law Group LLP; Vani Moodley, Esq.

(57) ABSTRACT

A method and system for determining a speed of a vehicle based on a GPS speed captured from a Global Positioning System (GPS). A capturing module captures GPS speed $V_x$ and a horizontal accuracy value corresponding to a time stamp $T_x$. A speed modification module modifies the GPS speed $V_x$ corresponding to the time stamp $T_x$. A speed correcting module corrects the GPS speed $V_x$ corresponding to the time stamp $T_x$. The GPS speed may be corrected by filtering an error in the GPS speed by using a Slope dependent averaging (SDA) filter in order to obtain a first corrected speed $V_x'$. Further, the first corrected speed is corrected by selecting one of a center weight (CW) filter and an edge weight (EW) filter, based upon a pre-defined condition, in order to obtain a second corrected speed $V_x''$ indicating the speed of the vehicle.

16 Claims, 6 Drawing Sheets (51) Int. Cl.
    *G01P 21/00*    (2006.01)
    *G01S 19/40*    (2010.01)
    *G01S 19/52*    (2010.01)

(56) References Cited

OTHER PUBLICATIONS

Thomas O'Kane et al., "Vehicle Speed Estimation Using GPS/RISS (Reduced Inertial Sensor System)" Department of Electronic Engineering, National University of Ireland, Maynooth, (NUIM), Maynooth, Co. Kildare, Ireland, ISSC, Jun. 20-21, 2013, 6 pages.

* cited by examiner

SYSTEM AND METHOD FOR DETERMINING SPEED OF A VEHICLE BASED ON GPS SPEED

PRIORITY INFORMATION

This present application claims priority from Indian patent application number 2240/MUM/2014 filed on Jul. 9, 2014, the complete disclosure of which, in its entirety, is herein incorporated by reference.

TECHNICAL FIELD

The present subject matter described herein, in general, relates to a system and a method for determining speed of a vehicle, and more particularly to the system and the method for determining the speed based on GPS speed captured from a Global Positioning System (GPS).

BACKGROUND

Today, one of the major areas of concern for insurance companies is to calculate insurance premium based on driving behavior of a driver driving a vehicle. It has been observed that the insurance premium may be calculated using a telematics application such as usage-based insurance (UBI) or Pay as You Drive (PAYD). The telematics application may facilitate measuring and analyzing the driving behavior for calculating the insurance premium. In order to analyze the driving behavior, the insurance companies may define a few specific driving signatures associated with one or more risk events for which the insurance premium may be calculated. Examples of the one or more events may include hard brake, harsh acceleration, harsh deceleration, hard cornering. The driving signatures plays a vital role in determining the insurance premium based on the one or more risk events for a specific driver and thus the principal idea behind using the UBI or the PAYD application is to measure acceleration, that is, a quick or sudden change of the speed of the vehicle for detecting at least one of the one or more risk events. Therefore, it is evident that a continuous monitoring and capturing of the speed of the vehicle is desired.

In conventional methods, speed of the vehicle may be measured using on board devices (OBDs) associated with the vehicle. However, the installation or deployment of the OBDs for measuring the speed requires huge investment cost. With the deep penetration of smart phones and mobile applications worldwide, the insurance companies are optimistic that smart phones may be replaced with the OBD 2 device for measuring the speed. For such cases, a driver own smart phone may be used for the UBI application. In general, the smart phones include a GPS and an inertial navigation system (INS) comprising three axis accelerometer and gyroscope. The three axis accelerometer measures the speed of the vehicle but may include an error while measuring the speed and therefore does not indicate correct speed of the vehicle. This is because, when the orientation of the three axis accelerometer changes, due to change in the orientation of the smart phone, it becomes intricate to make judicious assessment in variation of the speed, and hence there is an error in the speed measured by the three axis accelerometer.

Though the GPS, on the other hand, does not depend on the orientation of the smart phone and may be used worldwide, any place, any time but the GPS based navigational system may not be accurate since it follows probabilistic approach towards measuring both the position co-ordinates of the vehicle as along with the speed. Further, GPS receivers, while doing such measurements, may indicate the error in measuring the speed, using the parameter called horizontal accuracy (HA) or Dilution of Precision (DOP). In one aspect, the HA indicates that the signal to noise ratio of the GPS signal received is low and therefore there exist the error in the measurement. Further, it has been observed that the GPS measurements require at least four visible satellites. In dense urban areas, sometimes, the visibility is lost, resulting in either no measurement or completely spurious measurement.

The GPS speed may provide an accurate measure of the speed when the vehicle is moving at a constant speed as the GPS based speed is internally filtered to determine the correct speed. However, in case of sharp acceleration or sharp deceleration, due to sudden application of brake, the GPS may not provide the accurate measure of the speed since the GPS is not capable to consider sudden changes in the speed (i.e. sharp acceleration or sharp deceleration). Thus, in view of the above, it is evident that the speed measured from the GPS includes multitude of potential errors that is to be eliminated in order to determine the correct speed of the vehicle for detecting the one or more risk events.

SUMMARY

Before the present systems and methods, are described, it may be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for determining a speed of a vehicle based on a GPS speed and the concepts are further described below in the detailed description. This summary is not intended to identify essential features of the claimed subject matter nor is it intended for use in detecting or limiting the scope of the claimed subject matter.

In one implementation, a system for determining a speed of a vehicle based on a GPS speed captured from a Global Positioning System (GPS) is disclosed. In one aspect, the system may comprise a processor and a memory coupled to the processor for executing a plurality of modules present in the memory. The plurality of modules may comprise a capturing module, a speed modification module, and a speed correcting module. The capturing module may capture GPS speed $V_x$ and a horizontal accuracy value corresponding to a time stamp $T_x$. The speed modification module may modify the GPS speed $V_x$ corresponding to the time stamp $T_x$ when the horizontal accuracy corresponding to the time stamp $T_x$ is greater than a pre-defined value. The correcting module may correct the GPS speed $V_x$ corresponding to the time stamp $T_x$. It may be understood that the GPS speed may be corrected by filtering an error in the GPS speed by using a Slope dependent averaging (SDA) filter in order to obtain a first corrected speed $V_x'$ and selecting one of a centre weight (CW) filter and an edge weight (EW) filter, based upon a pre-defined condition, to correct the first corrected speed $V_x'$ in order to obtain a second corrected speed $V_x''$. The second corrected speed $V_x''$ indicates the speed of the vehicle.

In another implementation, a method for determining a speed of a vehicle based on a GPS speed captured from a Global Positioning System (GPS) is disclosed. In one aspect, GPS speed $V_x$ and a horizontal accuracy value corresponding to a time stamp $T_x$ may be captured. Upon capturing, the GPS speed $V_x$ corresponding to the time stamp $T_x$ may be modified when the horizontal accuracy corresponding to the time stamp $T_x$ is greater than a pre-defined value. Upon modifying the GPS speed $V_x$, the GPS speed $V_x$ corresponding to the time stamp $T_x$ may be corrected. In one aspect, the GPS speed may be corrected by filtering an error in the GPS speed by using a Slope dependent averaging (SDA) filter in order to obtain a first corrected speed $V_x'$. Further, the method comprises selecting one of a centre weight (CW) filter and an edge weight (EW) filter, based upon a pre-defined condition, to correct the first corrected speed $V_x'$ in order to obtain a second corrected speed $V_x''$. The second corrected speed $V_x''$ indicates the speed of the vehicle. In one aspect, the aforementioned method of determining the speed of the vehicle is performed by a processor using programmed instructions stored in a memory.

In yet another implementation, non-transitory computer readable medium embodying a program executable in a computing device for determining a speed of a vehicle based on a GPS speed captured from a Global Positioning System (GPS) is disclosed. The program may comprise a program code for capturing GPS speed $V_x$ and a horizontal accuracy value corresponding to a time stamp $T_x$. The program may further comprise a program code for modifying the GPS speed $V_x$ corresponding to the time stamp $T_x$ when the horizontal accuracy corresponding to the time stamp $T_x$ is greater than a pre-defined value. The program may further comprise a program code for correcting the GPS speed $V_x$ corresponding to the time stamp $T_x$. In one aspect, the GPS speed may be corrected by filtering an error in the GPS speed by using a Slope dependent averaging (SDA) filter in order to obtain a first corrected speed $V_x'$. Further, the GPS speed may be corrected by selecting one of a centre weight (CW) filter and an edge weight (EW) filter, based upon a pre-defined condition, to correct the first corrected speed $V_x'$ in order to obtain a second corrected speed $V_x''$. The second corrected speed $V_x''$ indicates the speed of the vehicle.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System and method for determining a speed of a vehicle based on a GPS speed captured from a Global Positioning System (GPS) is described. In one aspect the speed of the vehicle may be determined to detect one or more risk events associated to a driving behavior of a driver driving the vehicle. Examples of the one or more risk events may include, but not limited to, a hard brake, a harsh acceleration, a harsh deceleration, a hard cornering, and the like. In one aspect, the one or more risk events may be detected to analyze the driving behavior and thereby deriving a driving profile of the driver for a pre-determined period of time. The driving profile may be used by insurance companies in order to compute the insurance premium for the driver by using a telematics application such as usage-based insurance (UBI) or Pay as You Drive (PAYD). Therefore, in order to derive the driving behavior, the speed of the vehicle driven by the driver should be determined accurately so that such information may be utilized for deriving stream reasoning.

In general, the GPS employed in the vehicle or present in the Smartphone of the driver driving the vehicle may be configured to measure the speed, referred hereinafter as "GPS speed", of the vehicle. However, the GPS speed is erroneous due to variations observed in acceleration and deceleration values associated to the vehicle as compared to their respective predefined values. Therefore, the GPS speed is to be corrected in order to determine correct or true speed of the vehicle. The present disclosure therefore proposes methods and systems to correct the GPS speed. In order to correct the GPS speed, initially, the GPS speed may be captured from the GPS corresponding to a time stamp. In addition to the GPS speed, a horizontal accuracy value and latitude-longitude coordinates corresponding to the time stamp is also captured.

Upon capturing the GPS speed and the horizontal accuracy value, the GPS speed may be modified when the horizontal accuracy is greater than a pre-defined value. In one aspect the pre-defined value is 20 meters. In one example when the horizontal accuracy is greater than 20 meters, the GPS speed is modified based on average of GPS speeds corresponding to previous and successive time stamps of the GPS speed.

Subsequent to the modification, the GPS speed may be corrected by passing through a series of filters in order to determine the speed of the vehicle for deriving the stream reasoning accurately. In one aspect, the GPS speed may be corrected by filtering the error present in the GPS speed using a Slope dependent averaging (SDA) filter. The error may be filtered from the GPS speed by using a first mathematical formulation in order to obtain a first corrected speed. The first corrected speed may further be passed through at least one of a center weight (CW) filter and edge weight (EW) filter in order to obtain a second corrected speed. The second corrected speed indicates the speed of the vehicle. It may be understood that the first corrected speed may be passed through the CW filter and the EW filter parallely to correct the first corrected speed thereby obtaining the second corrected speed. The second corrected speed may be obtained from one of the CW filter and the EW filter based upon a pre-defined condition.

In one aspect, the pre-defined condition includes difference of the GPS speed and a first speed determined based on the latitude-longitude coordinates being greater than a pre-defined speed. The pre-defined condition further includes ratio of jerk to acceleration, determined based on the acceleration value and the deceleration value associated to the vehicle, being greater or less than the predefined acceleration value within a pre-defined time interval. It may be understood that when the pre-defined condition, as aforementioned, is satisfied then EW filter else the CW filter is selected for obtaining the second corrected speed. Thus, from the above, the second corrected speed indicating the accurate speed of the vehicle may be utilized for deriving the stream reasoning.

While aspects of described system and method for determining the speed of the vehicle based on the GPS speed captured from the GPS may be implemented in any number of different computing systems, environments, and/or configurations, the embodiments are described in the context of the following exemplary system.

Figure 1:
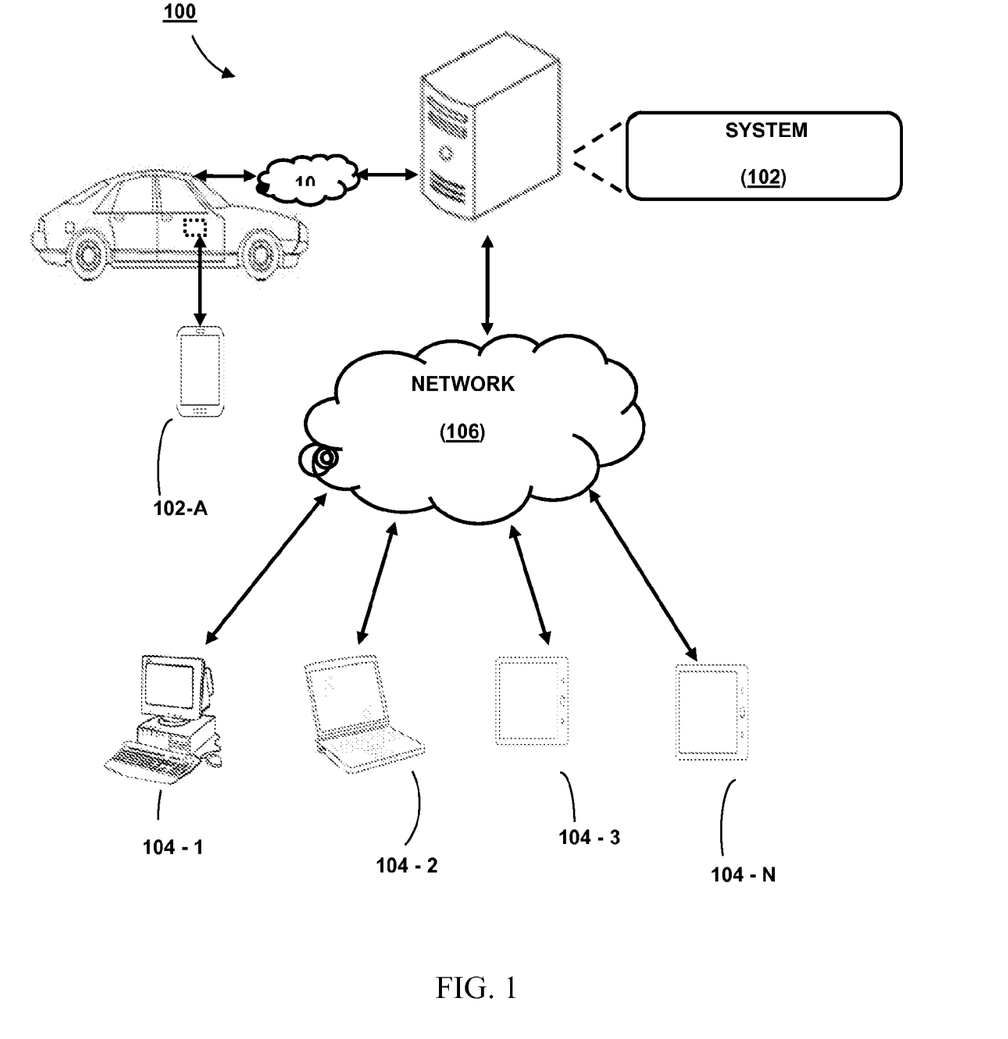
FIG. 1 illustrates a network implementation for determining a speed of a vehicle based on a GPS speed is shown, in accordance with an embodiment of the present disclosure.

Referring now to FIG. 1, a network implementation 100 of a system 102 for determining a speed of a vehicle based on a GPS speed captured from a Global Positioning System (GPS) is illustrated, in accordance with an embodiment of the present disclosure. The system 102 captures GPS speed $V_x$ and a horizontal accuracy value corresponding to a time stamp $T_x$. The system 102 further modifies the GPS speed $V_x$ corresponding to the time stamp $T_x$ when the horizontal accuracy corresponding to the time stamp $T_x$ is greater than a pre-defined value. The system 102 further corrects the GPS speed $V_x$ corresponding to the time stamp $T_x$. In one aspect the GPS speed may be corrected by filtering an error in the GPS speed by using a Slope dependent averaging (SDA) filter in order to obtain a first corrected speed $V_x'$ and selecting one of a centre weight (CW) filter and an edge weight (EW) filter, based upon a pre-defined condition, to correct the first corrected speed $V_x'$ in order to obtain a second corrected speed $V_x''$. The second corrected speed $V_x''$ indicates the speed of the vehicle.

Although the present subject matter is explained considering that the system 102 is implemented on a server. More specifically, the system may also be implemented on a smart phone 102-A or a vehicle having a pre-installed Global Positioning System (GPS) device. It may be understood that the system 102 may also be implemented in a variety of computing systems such as a laptop computer, a desktop computer, a notebook, a workstation, a mainframe computer, a server, a network server, a cloud-based computing environment and the like. In one implementation, the system 102 may comprise the cloud-based computing environment in which the user may operate individual computing systems configured to execute remotely located applications. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
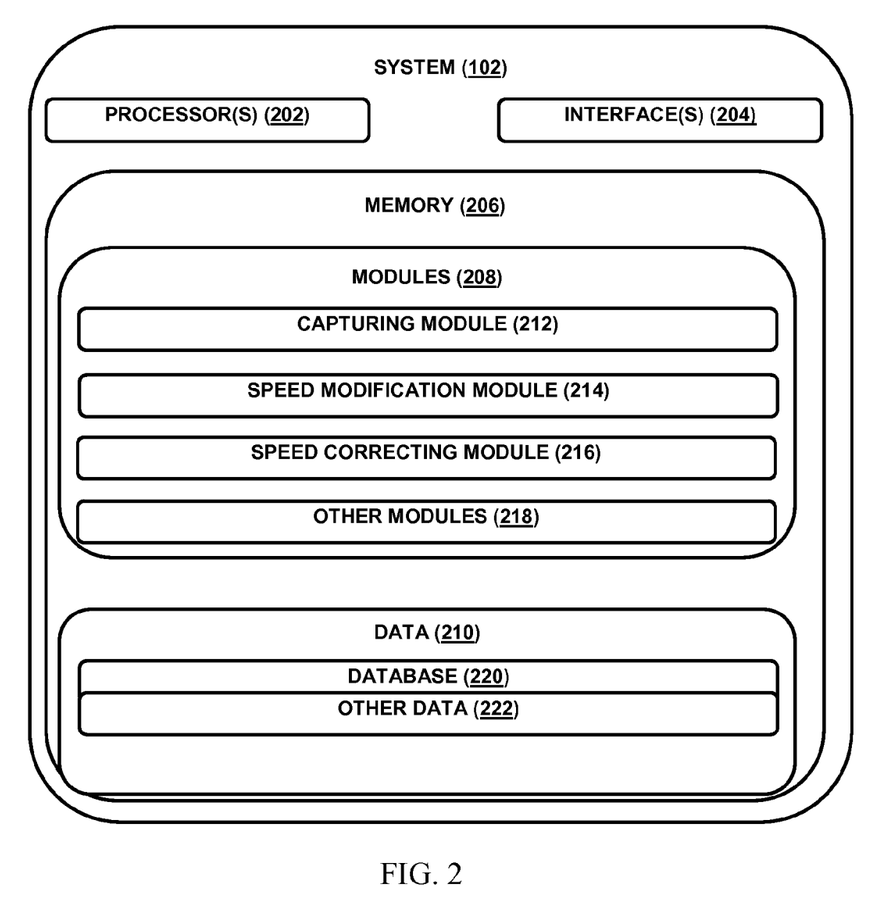
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104 also hereinafter referred to as client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a capturing module 212, a speed modification module 214, a speed correcting module 216, and other modules 218. The other modules 218 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 220 and other data 222. The other data 222 may include data generated as a result of the execution of one or more modules in the other modules 218.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for determining a speed of a vehicle based on a GPS speed captured from a Global Positioning System (GPS). In order to determine the speed of the vehicle, the system 102 may employ the plurality of modules i.e. the capturing module 212, the speed modification module 214, and the speed correcting module 216. The detailed working of the plurality of modules is described below.

Figure 3:
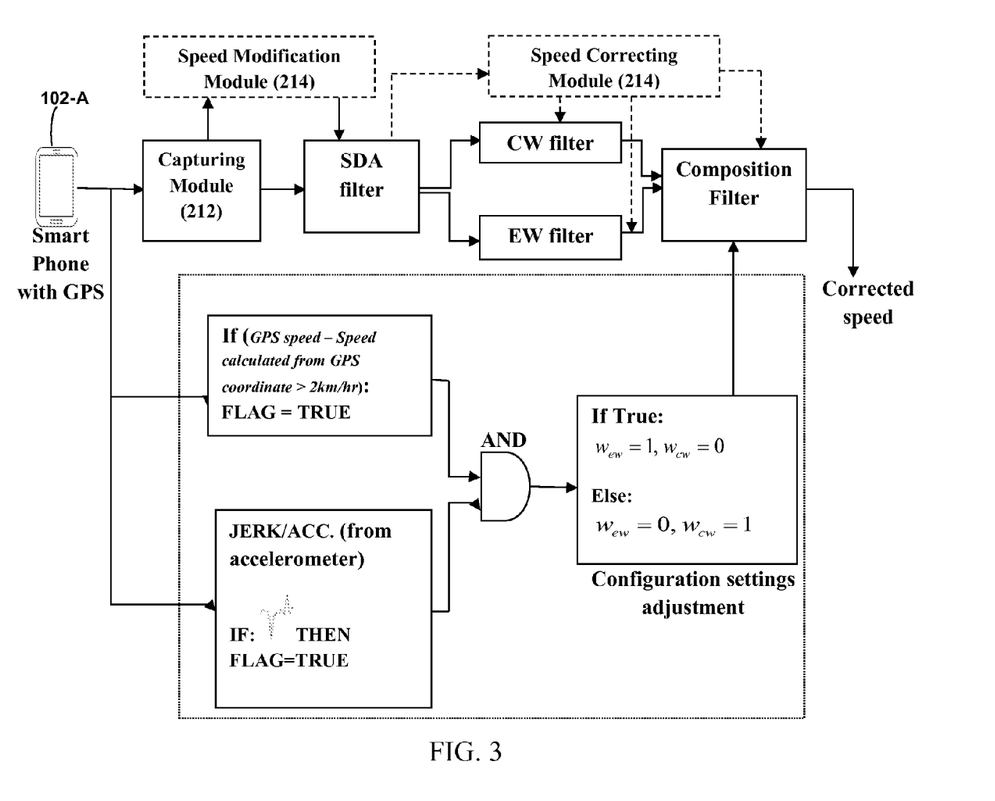
FIG. 3 illustrates functional representation of the system, in accordance with an embodiment of the present disclosure.

Referring to FIG. 3, it may be understood that a smart phone 102-A, having a Global Positioning System (GPS) may be carried by a passenger travelling in a vehicle (not shown in the figure) or a driver driving the vehicle. It may further be understood that the GPS may also be deployed in the vehicle. Since the GPS may either be carried by the passenger or deployed in the vehicle, the capturing module 212 may capture one or more parameters associated to speed and the corresponding location of the vehicle by using the GPS. The one or more parameters may include, but not limited to, GPS speed $V_x$, a horizontal accuracy value, and latitude-longitude coordinates. The one or more parameters are captured corresponding to a time stamp $T_x$.

In order to understand the working of the capturing module 212, consider an example where a person X is carrying a smart phone and moving from location X to location Y in a vehicle. It may be understood that the person X is a driver driving the vehicle from the location X to the location Y. The capturing module 212 may capture, at 1 Hz sampling rate, the GPS speed $V_1$ i.e. 20 kilometers per hour corresponding to a time stamp $T_1$, $V_2$ i.e. 21 kilometers per hour corresponding to a time stamp $T_2$, and $V_3$ i.e. 30 kilometers per hour corresponding to a time stamp $T_3$. Along with the GPS speeds ($V_1$, $V_2$, and $V_3$), the capturing module 212 may further capture a horizontal accuracy i.e. 15 corresponding to $T_1$, 25 corresponding to $T_2$, and 18 corresponding to $T_3$. In one aspect, the horizontal accuracy indicates Dilution of precision (DOP) of the GPS speed. In one aspect, the GPS speeds $V_1$, $V_2$, and $V_3$ and the horizontal accuracy corresponding to the time stamp $T_1$, $T_2$, and $T_3$ respectively may be stored in a database 220. In this manner, the capturing module 212 facilitates to capture the one or more parameters that may further be processed in order to derive stream reasoning.

After storing the GPS speed $V_x$ and the horizontal accuracy, the speed modification module 214 may retrieve the GPS speed $V_x$ from the database 220 and modify the GPS speed $V_x$ corresponding to the time stamp $T_x$ when the horizontal accuracy corresponding to the time stamp $T_x$ is greater than a pre-defined value. In one aspect, the GPS speed $V_x$ may be modified by computing an average of the GPS speeds $V_{x-1}$ and $V_{x+1}$ corresponding to time stamp $T_{x-1}$ and time stamp $T_{x+1}$ while taking into consideration that the horizontal accuracy corresponding to the time stamp $T_{x-1}$ and time stamp $T_{x+1}$ is less than the predefined value. Upon the computation of the average of the GPS speeds $V_{x-1}$ and $V_{x+1}$, the GPS speed $V_x$ is replaced with the average of the GPS speeds $V_{x-1}$ and $V_{x+1}$. In this manner the GPS speed may be modified when the horizontal accuracy is greater than the pre-defined value.

In order to further understand the working of the modification module 214, consider the example, as aforementioned, where the horizontal accuracy corresponding to the time stamp $T_1$, $T_2$, and $T_3$ are captured by the capturing module 212. It may be understood that when the horizontal accuracy, corresponding to the time stamp $T_1$, $T_2$, and $T_3$, is greater than the pre-defined value i.e. 20 then the GPS speed corresponding to that time stamp is modified so as to keep the horizontal accuracy within the pre-defined value. Since the horizontal accuracy corresponding to the time stamp $T_2$ is 25, the modification module 214 modifies the GPS speed $V_2$ (i.e. 21 kilometers per hour) by computing an average of the GPS speeds $V_1$ and $V_3$ (i.e. $V_{x-1}$ and $V_{x+1}$). Upon computing the average, it is to be understood that the average of the GPS speeds $V_1$ (20 kilometers per hour) and $V_3$ (30 kilometers per hour) is 25 kilometers per hour. The average of the GPS speeds (25 kilometers per hour) may then be replaced with $V_2$ (21 kilometers per hour) thereby modifying the GPS speed $V_2$ corresponding to the time stamp $T_2$. In this manner, the modification module 214 modifies the GPS speed $V_x$ corresponding to the time stamp $T_x$ when the horizontal accuracy corresponding to the time stamp $T_x$ is greater than the pre-defined value.

Subsequent to the modification of the GPS speed $V_x$, the speed correcting module 216 may correct the GPS speed $V_x$ corresponding to the time stamp $T_x$. It may be understood that while capturing the GPS speed $V_x$, there might be likelihood that an error may be associated to the GPS speed $V_x$. The error indicates an acceleration value and a deceleration value associated to the vehicle being greater or less than a pre-defined acceleration value respectively. Thus, in order to correct the GPS speed $V_x$, the speed correcting module 216 may correct the error by passing through a series of filters. Initially, the speed correcting module 216 passes the GPS speed $V_x$ through a Slope dependent averaging (SDA) filter in order to obtain a first corrected speed $V_x'$. The first corrected speed $V_x'$ may be obtained by using a first formulation i.e.

$$V_x' = w_{x-1} v_{x-1}' + w_x v_x + w_{x+1} v_{x+1} \quad (1)$$

where $w_{x-1}$, $w_x$, and $w_{x+1}$ indicate a first set of weights.

In order to further understand the filtration by using the SDA filter, consider GPS speeds represented by $V_1$, $V_2$, and $V_3$ at time instances $T_1$, $T_2$, and $T_3$ respectively (consecutively captured at 1 second apart). In order to correct the GPS speed $V_2$ corresponding to $T_2$, consider that $V_1'$ is a corrected speed corresponding to $V_1$. Further compute θ by using following equation $$\theta = \pi - abs\left(\tan^{-1}\left(\frac{v_3 - v_2}{t_3 - t_2}\right) - \tan^{-1}\left(\frac{v_2 - v_1'}{t_2 - t_1}\right)\right) \quad (2)$$

where θ indicates an angle formed by plotting $V_{x-1}$, $V_x$, and $V_{x+1}$ against $T_{x-1}$, $T_x$ and $T_{x+1}$, and wherein $V_x$ is the vertex of the angle formed. Further it may be understood that $T_2-T_1=T_3-T_2=1$. In one aspect, $w_{x-1}$, $w_{x+1}$ are 0.5 and $w_x$ is 0 when (θ<π/4) whereas $w_{x-1}$, $w_{x+1}$ are 0 and $w_x$ is 1 when (θ>π/4). In one aspect, the first set of weights are computed based on the below mentioned formulation:

When (θ<π/4)

$$w_1 = w_3 = \left(\frac{1-w_2}{2}\right) \text{ where } w_2 = 0 \quad (3)$$

When (θ>π/4)

$$w_1 = w_3 = \left(\frac{1-w_2}{2}\right) \text{ where, } w_2 = 1 \quad (4)$$

In one aspect, $w_1$, $w_2$, and $w_3$ representing $w_{x-1}$, $w_x$, and $w_{x+1}$ respectively. Thus, based on the equations (1), (2), (3), and (4), the first corrected speed $V_2'$ may be computed by $$V_2' = w_1 v_1' + w_2 v_2 + w_3 v_3 \quad (5)$$

where $V_2'$ indicates the first corrected speed corresponding to $V_2$. Similarly, the speed correcting module 216 may correct the GPS speed $V_3$ in order to obtain the first corrected speed $V_3'$. Thus, in this manner, the first corrected speed i.e. $V_1'$, $V_2'$, and $V_3'$ may be obtained.

After obtaining the first corrected speed, the speed correcting module 216 may correct the first corrected speed by passing the first corrected speed through a centre weight (CW) filter and an edge weight (EW) parallely. In one aspect, the second corrected speed may be obtained, using the CW filter, by $$V_x'' = w_a v_{x-1}' + w_b v_x' + w_c v_{x+1}' \quad (6)$$

where $V_x''$ indicates the second corrected speed, $w_a$, $w_b$, and $w_c$ indicates a second set of weights, and $v_{x-1}'$, $v_x'$, $v_{x+1}'$ indicates the first corrected speed, corresponding to $v_{x-1}$, $v_x$, $v_{x+}$, as obtained in the earlier step.

Similarly, the second corrected speed may be obtained, using the EW filter, by $$V_x'' = w_d v_{x-2}' + w_e v_{x-1}' + w_f v_x' \quad (7)$$

where $V_x''$ indicates the second corrected speed, $w_d$, $w_e$, and $w_f$ indicates the second set of weights, and $v_{x-2}'$, $v_{x-1}'$, $v_x'$ indicates the first corrected speeds, as obtained in the earlier step, corresponding to $v_{x-2}$, $v_{x-1}$, $v_x$.

It may be understood that second set of weights i.e. $w_a$, $w_b$, and $w_c$ are 0.2873, 0.59677, 0.11158 respectively and where $w_d$, $w_e$, and $w_f$ are 0.11158, 0.2873, 0.59677 respectively. In one aspect, the second set of weights may be pre-determined by using Chebyshev polynomials algorithm.

In order to understand the aforementioned steps for obtaining the second corrected speed based on the equation (6) and (7), consider that the capturing module captures $V_1'$, $V_2'$, $V_3'$, and $V_4'$ corresponding to $T_1$, $T_2$, $T_3$, and $T_4$. Let $V_1'$, $V_2'$, $V_3'$, and $V_4'$ are 20, 25, 28, and 30 kilometers per hour respectively. It may be further be understood that $V_1'$, $V_2'$, $V_3'$, and $V_4'$ are the first corrected speed corrected by the speed correcting module 216 using the SDA filter. In one aspect, it may considered that $V_1'$ and $V_2'$ are corrected by using at least one of the CW filter or the EW filter thereby obtaining $V_1''$ and $V_2''$.

Now, in order to obtain the second corrected speed $V_3''$ corresponding to $V_3'$ using the CW filter, equation (6) may be used. By using the equation (6), following equation may be obtained for obtaining the second corrected speed corresponding to $V_3'$ $$v_3'' = 0.2873(v_2') + 0.59677(v_3') + 0.11158(v_4')$$

where $V_2'$, $V_3'$, and $V_4'$ are 25, 28, and 30 (pre-determined using the Chebyshev polynomials algorithm), therefore $$v_3'' = 0.2873(25) + 0.59677(28) + 0.11158(30)$$

and hence $V_3''=27.23946$ (the second corrected speed corresponding to $V_3'$ using the CW filter)

In order to obtain the second corrected speed $V_3''$ corresponding to $V_3'$ using the EW filter, equation (7) may be used. By using the equation (7), following equation may be obtained for obtaining the second corrected speed corresponding to $V_3'$ $$v_3'' = 0.11158(v_1') + 0.2873(v_2') + 0.59677(v_3')$$

where $V_1'$, $V_2'$, and $V_3'$ are 20, 25, and 28 (pre-determined using the Chebyshev polynomials algorithm), therefore $$V_3'' = 0.11158(20) + 0.2873(25) + 0.59677(28)$$

and hence $V_3''=26.12366$ (the second corrected speed corresponding to $V_3'$ using the EW filter).

Subsequent to the determination of the second corrected speed $V_x''$, one of the CW filter and the EW filter may be selected based upon a pre-defined condition, using a composition filter. Since both the CW filter and the EW filter may facilitate to obtain the second corrected speed $V_x''$, one of the second corrected speed $V_x''$ (obtained from the CW filter and the EW filter) may be selected based on the pre-defined condition. The pre-defined condition includes computing a difference of the GPS speed and the first speed determined based on the latitude-longitude coordinates being greater than a pre-defined speed i.e. 2 kilometers per hour. The pre-defined condition further includes ratio of jerk to acceleration, determined based on the acceleration value and the deceleration value associated to the vehicle, being greater or less than the predefined acceleration value within a pre-defined time interval.

It is to be understood that when the pre-defined condition is true, the EW filter may be selected by the speed correcting module 216 in order to obtain the second corrected speed $V_x''$ or the CW filter may be selected in order to obtain the second corrected speed $V_x''$. Thus, based on the functioning of the modules 208, as aforementioned, the GPS speed may be corrected thereby determining the speed of the vehicle for deriving the stream reasoning accurately.

Figure 4:
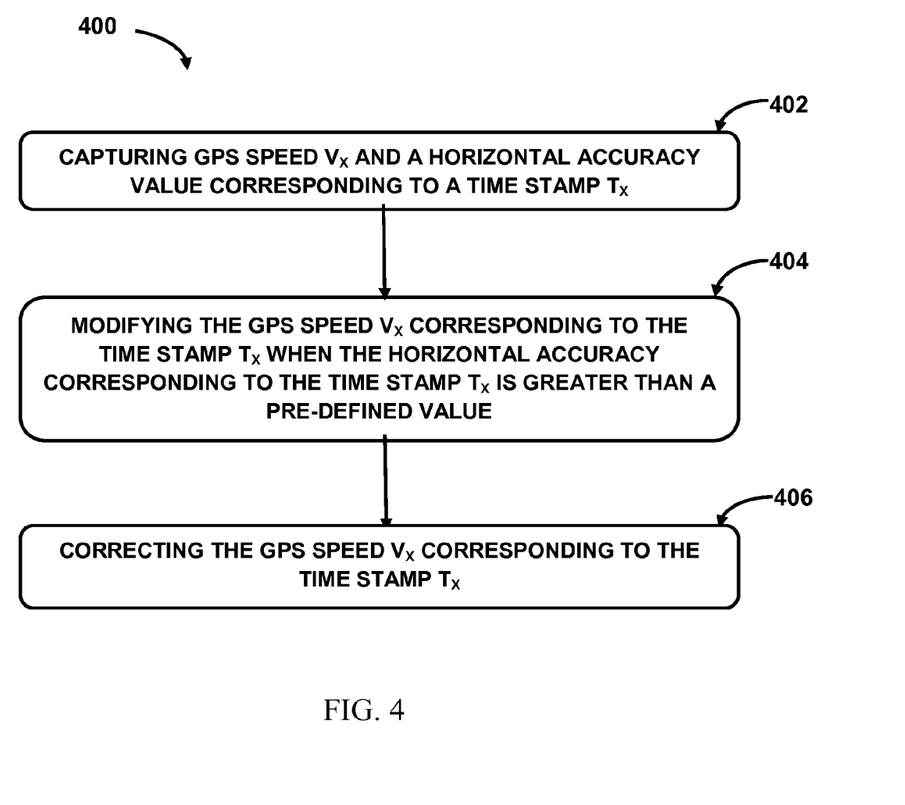
FIGS. 4, 5 and 6 illustrate a method for determining the speed of the vehicle based on the GPS speed, in accordance with an embodiment of the present disclosure.

Referring now to FIG. 4, a method 400 for determining a speed of a vehicle based on a GPS speed captured from a Global Positioning System (GPS) is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented in the above described in the system 102.

At block 402, GPS speed $V_x$ and a horizontal accuracy value corresponding to a time stamp $T_x$ may be captured. In one implementation, the GPS speed $V_x$ and a horizontal accuracy value corresponding to a time stamp $T_x$ may be captured by the capturing module 212.

At block 404, the GPS speed $V_x$ corresponding to the time stamp $T_x$ may be modified when the horizontal accuracy corresponding to the time stamp $T_x$ is greater than a pre-defined value. In one implementation, the GPS speed may be modified by the speed modification module 214. Further, the block 404 is explained in greater detail in FIG. 5.

At block 406, the GPS speed $V_x$ corresponding to the time stamp $T_x$ may be corrected. In one implementation, the GPS speed $V_x$ may be corrected by the speed correcting module 216. Further, the block 406 is explained in greater detail in FIG. 6.

Figure 5:
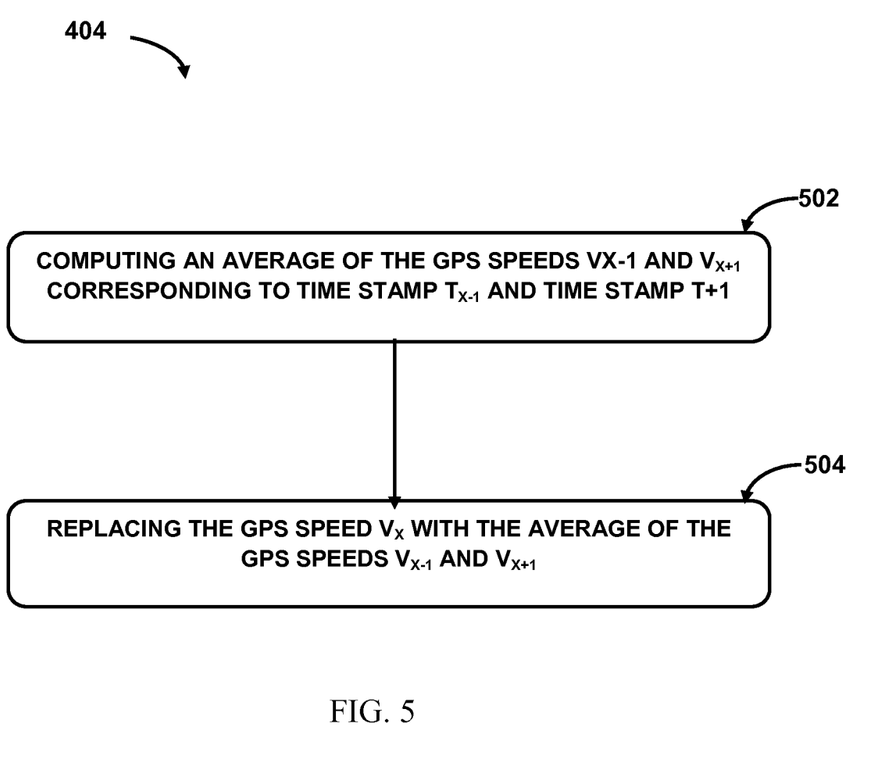

Referring now to FIG. 5, the block 404 for modifying the GPS speed $V_x$ corresponding to the time stamp $T_x$ when the horizontal accuracy corresponding to the time stamp $T_x$ is greater than a pre-defined value is shown, in accordance with an embodiment of the present subject matter.

At block 502, an average of the GPS speeds $V_{x-1}$ and $V_{x+1}$ corresponding to time stamp $T_{x-1}$ and time stamp $T_{x+1}$ may be computed. In one aspect, the horizontal accuracy corresponding to the time stamp $T_{x-1}$ and time stamp $T_{x+1}$ is less than the predefined value. In one implementation, the average may be computed by the speed modification module 214.

At block 504, the GPS speed $V_x$ may be replaced with the average of the GPS speeds $V_{x-1}$ and $V_{x+1}$. In one implementation, the GPS speed $V_x$ may be replaced by the speed modification module 214.

Figure 6:
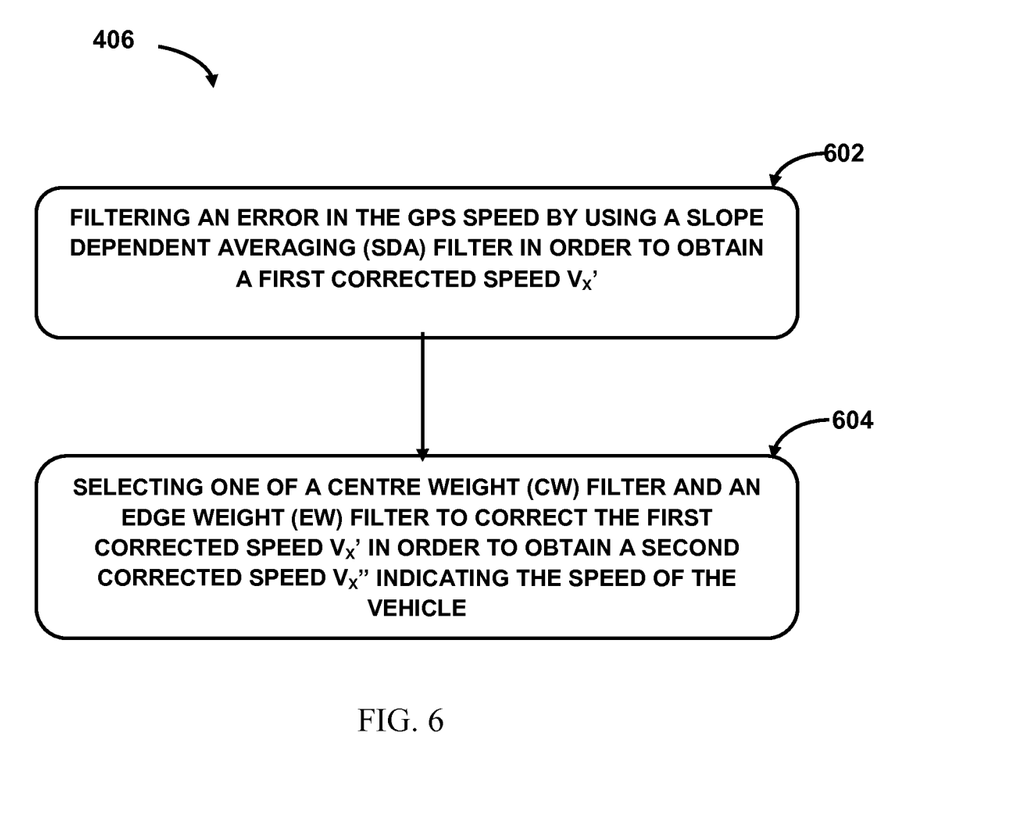

Referring now to FIG. 6, the block 406 for correcting the GPS speed $V_x$ corresponding to the time stamp $T_x$, in accordance with an embodiment of the present subject matter.

At block 602, an error may be filtered from the GPS speed by using a Slope dependent averaging (SDA) filter in order to obtain a first corrected speed $V_x'$. In one implementation, the error may be filtered by the speed correcting module 216.

At block 604, one of a centre weight (CW) filter and an edge weight (EW) filter may be selected, based upon a pre-defined condition, to correct the first corrected speed $V_x'$ in order to obtain a second corrected speed $V_x''$. The second corrected speed $V_x''$ indicates the speed of the vehicle. In one implementation, one of the CW filter and the EW filter may be selected by the speed correcting module 216.

Although implementations for methods and systems for determining a speed of a vehicle based on a GPS speed captured from a Global Positioning System (GPS) have been described in language specific to structural features and/or methods, it is to be understood that the appended claims are not necessarily limited to the specific features or methods described. Rather, the specific features and methods are disclosed as examples of implementations for determining the speed of the vehicle.

Exemplary embodiments discussed above may provide certain advantages. Though not required to practice aspects of the disclosure, these advantages may include those provided by the following features.

Some embodiments enable a system and a method to reduce the GPS based speed measurement errors thereby facilitating to determine the accurate speed more economically by eliminating on board devices.

Some embodiments enable the system and the method for identifying one or more risk events (hard brake, harsh acceleration, harsh deceleration, and hard cornering) associated to the driving behavior using the accurate speed for deriving stream reasoning.

Some embodiments enable the system and the method to utilize adaptive filters (SDA filter, CW filter, EW filter, and Composition filter) that facilitates to estimate the accurate speed by altering the weight coefficients of the filters in real-time.

Some embodiments enable the system and the method to determine the accurate speed from GPS measured speed, wherein the accurate speed may be utilized for driver profiling and insurance purpose.

What is claimed is:

1. A method for determining a speed of a vehicle based on a GPS speed captured from a Global Positioning System (GPS), the method comprising:

capturing, by a processor, a GPS speed $V_x$ and a horizontal accuracy value corresponding to a time stamp $T_x$;

modifying, by the processor, the GPS speed $V_x$ corresponding to the time stamp $T_x$ when the horizontal accuracy value corresponding to the time stamp $T_x$ is greater than a pre-defined value; and correcting, by the processor, the GPS speed $V_x$ corresponding to the time stamp $T_x$, wherein the GPS speed $V_x$ is corrected by filtering an error in the GPS speed $V_x$ by using a Slope dependent averaging (SDA) filter in order to obtain a first corrected speed $V_x'$, selecting one of a centre weight (CW) filter and an edge weight (EW) filter, based upon a pre-defined condition, to correct the first corrected speed $V_x'$ in order to obtain a second corrected speed $V_x''$, wherein the second corrected speed $V_x''$ indicates the speed of the vehicle, wherein the speed of the vehicle is determined accurately by altering a first set of weights associated with the SDA filter in real-time and a second set of weights associated with one of the CW filter and the EW filter in real-time.

2. The method of claim 1, wherein the capturing further comprises latitude-longitude coordinates corresponding to the time stamp $T_x$.

3. The method of claim 1, wherein the pre-defined value is 20 meters.

4. The method of claim 1, wherein the GPS speed $V_x$ corresponding to the time stamp $T_x$ is modified by computing an average of GPS speeds $V_{x-1}$ and $V_{x+1}$ corresponding to a time stamp $T_{x-1}$ and a time stamp $T_{x+1}$ while taking into consideration that the horizontal accuracy value corresponding to the time stamp $T_{x-1}$ and the time stamp $T_{x+1}$ is less than the predefined value, and replacing the GPS speed $V_x$ with the average of the GPS speeds $V_{x-1}$ and $V_{x+1}$.

5. The method of claim 1, wherein the error indicates an acceleration value and a deceleration value associated to the vehicle, being greater or less than a predefined acceleration value respectively.

6. The method of claim 1, wherein the first corrected speed $V_x'$ is obtained by $V_x' = w_{x-1}v_{x-1}' + w_x v_x + w_{x+1}v_{x+1}$, wherein $w_{x-1}$, $w_x$, and $w_{x+1}$ are the first set of weights and $v_{x-1}'$ is a corrected GPS speed corresponding to the time stamp $T_{x-1}$, and $v_x$, $v_{x+1}$ are GPS speeds corresponding to time stamps $T_x$ and $T_{x+1}$.

7. The method of claim 6, wherein the $w_{x-1}$, $w_{x+1}$ are 0.5 and $w_x$ is 0 when $(\theta < \pi/4)$, and wherein the $w_{x-1}$, $w_{x+1}$ are 0 and $w_x$ is 1 when $(\theta > \pi/4)$, wherein $\theta$ indicates an angle formed by plotting the corrected GPS speed $V'_{x-1}'$, the GPS speeds $V_x$, and $V_{x+1}$ against the corresponding time stamps $T_{x-1}, T_x$ and $T_{x+1}$, and wherein $V_x$ is the vertex of the angle formed.

8. The method of claim 1, wherein the second corrected speed $V_x''$ is obtained, using the CW filter, by $V_x'' = w_a v_{x-1}' + w_b v_x' + w_c v_{x+1}'$, and wherein $w_a$, $w_b$, and $w_c$ indicate the second set of weights, and wherein $v_{x-1}', v_x', v_{x+1}'$ are first corrected speeds associated with GPS speeds $V_{x-1}, V_x$, and $V_{x+1}$ corresponding to the time stamps $T_{x-1}, T_x$ and $T_{x+1}$.

9. The method of claim 1, wherein the second corrected speed $V_x''$ is obtained, using the EW filter, by $V_x'' = w_d v_{x-2}' + w_e v_{x-1}' + w_f v_x'$, and wherein $W_d$, $W_e$, and $W_f$ indicate the second set of weights, and wherein $v_{x-2}', v_{x-1}', v_x'$ are first corrected speeds associated with GPS speeds $V_{x-2}, V_{x-1}$, and $V_x$ corresponding to the time stamps $T_{x-2}, T_{x-1}$ and $T_x$.

10. The method of claim 8, wherein $w_a$, $w_b$, and $w_c$ are 0.2873, 0.59677, and 0.11158, respectively and wherein $w_a$, $w_b$, and $w_c$, are determined using Chebyshev polynomials algorithm.

11. The method of claim 1, wherein the GPS speed $V_x$ is captured using a smart phone or a GPS device preinstalled in the vehicle.

12. The method of claim 1, wherein the pre-defined condition includes
difference of the GPS speed $V_x$ and a first speed determined based on latitude-longitude coordinates being greater than a pre-defined speed, and
ratio of jerk to acceleration, determined based on an acceleration value and a deceleration value associated to the vehicle, being greater or less than a predefined acceleration value within a pre-defined time interval.

13. The method of claim 1, wherein the EW filter is selected when the predefined condition is satisfied else the CW filter is selected.

14. A system for determining a speed of a vehicle based on a GPS speed captured from a Global Positioning System (GPS), the system comprising:
a processor; and
a memory coupled to the processor, wherein the processor executes a plurality of modules stored in the memory, and wherein the plurality of modules comprising:
a capturing module for capturing a GPS speed $V_x$ and a horizontal accuracy value corresponding to a time stamp $T_x$;
a speed modification module for modifying the GPS speed $V_x$ corresponding to the time stamp $T_x$ when the horizontal accuracy value corresponding to the time stamp $T_x$ is greater than a pre-defined value; and
for correcting the GPS speed $V_x$ corresponding to the time stamp $T_x$, wherein the GPS speed $V_x$ is corrected by
filtering an error in the GPS speed $V_x$ by using a Slope dependent averaging (SDA) filter in order to obtain a first corrected speed $V_x'$,
selecting one of a centre weight (CW) filter and an edge weight (EW) filter, based upon a pre-defined condition, to correct the first corrected speed $V_x'$ in order to obtain a second corrected speed $V_x''$, wherein the second corrected speed $V_x''$ indicates the speed of the vehicle,
wherein the speed of the vehicle is determined accurately by altering a first set of weights associated with the SDA filter in real-time and a second set of weights associated with one of the CW filter and the EW filter in real-time.

15. A non-transitory computer readable medium embodying a program executable in a computing device for determining a speed of a vehicle based on a GPS speed captured from a Global Positioning System (GPS), the program comprising:
a program code for capturing a GPS speed $V_x$ and a horizontal accuracy value corresponding to a time stamp $T_x$;
a program code for modifying the GPS speed $V_x$ corresponding to the time stamp $T_x$ when the horizontal accuracy value corresponding to the time stamp $T_x$ is greater than a pre-defined value; and
a program code for correcting the GPS speed $V_x$ corresponding to the time stamp $T_x$, wherein the GPS speed $V_x$ is corrected by
filtering an error in the GPS speed $V_x$ by using a Slope dependent averaging (SDA) filter in order to obtain a first corrected speed $V_x'$,
selecting one of a centre weight (CW) filter and an edge weight (EW) filter, based upon a pre-defined condition, to correct the first corrected speed $V_x'$ in order to obtain a second corrected speed $V_x''$, wherein the second corrected speed $V_x''$ indicates the speed of the vehicle,
wherein the speed of the vehicle is determined accurately by altering a first set of weights associated with the SDA filter in real-time and a second set of weights associated with one of the CW filter and the EW filter in real-time.

16. The method of claim 9, wherein $w_d$, $w_e$, and $w_f$ are 0.11158, 0.2873, and 0.59677, respectively, and wherein $w_d$, $w_e$, and $w_f$ are determined using Chebyshev polynomials algorithm.

* * * * *